United States Patent [19]

Tauster et al.

[11] 4,402,869

[45] Sep. 6, 1983

[54] GROUP VIII METALS ON MANGANESE-CONTAINING OXIDE SUPPORTS WHICH EXHIBIT STRONG METAL SUPPORT INTERACTIONS

[75] Inventors: Samuel J. Tauster, Englishtown; Shun C. Fung, Edison, both of N.J.

[73] Assignee: Exxon Research and Engineering Co., Florham Park, N.J.

[21] Appl. No.: 235,795

[22] Filed: Feb. 19, 1981

Related U.S. Application Data

[63] Continuation-in-part of Ser. No. 19,494, Mar. 12, 1979, abandoned.

[51] Int. Cl.³ .................... B01J 21/04; B01J 21/08; B01J 23/64; B01J 23/84
[52] U.S. Cl. .................... 252/471; 252/459; 252/460; 252/462; 252/466 J; 252/466 PT
[58] Field of Search ............ 252/459, 460, 462, 466 J, 252/466 PT, 470, 471

[56] References Cited

U.S. PATENT DOCUMENTS

| | | | |
|---|---|---|---|
| 3,278,568 | 10/1966 | Jonge et al. | 252/471 X |
| 3,873,469 | 3/1975 | Foster et al. | 252/460 X |
| 3,941,820 | 3/1976 | Jackson et al. | 260/449.6 |
| 4,149,998 | 4/1979 | Tauster et al. | 252/472 X |

FOREIGN PATENT DOCUMENTS 762412  12/1976  South Africa .
762413  12/1976  South Africa .

*Primary Examiner*—W. J. Shine
*Attorney, Agent, or Firm*—Edward M. Corcoran

[57] ABSTRACT

This invention relates to catalyst compositions comprising one or more Group VIII catalytic metals on a manganese-containing oxide support wherein the catalyst composition is contacted with a hydrogen-containing reducing atmosphere at elevated temperature to produce a catalyst composition which exhibits suppressed hydrogen chemisorption. The manganese-containing oxide may itself be supported on or mixed with inorganic refractory oxides prior to contacting the catalyst composition with the reducing atmosphere.

13 Claims, No Drawings

GROUP VIII METALS ON MANGANESE-CONTAINING OXIDE SUPPORTS WHICH EXHIBIT STRONG METAL SUPPORT INTERACTIONS

CROSS-REFERENCE TO RELATED APPLICATIONS

This invention is a continuation-in-part application of co-pending application Ser. No. 19,494, filed on Mar. 12, 1979, now abandoned.

FIELD OF THE INVENTION

This invention relates to catalyst compositions comprising Group VIII catalytic metal supported on a manganese-containing oxide support. More particularly, this invention relates to catalyst compositions comprising Group VIII catalytic metal supported on a manganese-containing oxide support, wherein the catalyst composition is contacted with a reducing atmosphere, such as hydrogen, at elevated temperatures to produce a catalyst composition which exhibits suppressed hydrogen chemisorption.

SUMMARY OF THE INVENTION

This invention relates to catalyst compositions comprising one or more Group VIII catalytic metal components dispersed and supported on a manganese-containing oxide support, preferably a manganese oxide support, wherein said catalyst composition is contacted with a suitable reducing atmosphere at elevated temperature and for a time sufficient prior to use to produce a catalyst composition of reduced hydrogen chemisorption. For Group VIII noble metals contacting temperature will preferably be at least about 250° C., while for the other Group VIII metals it is about 300° C. It has been discovered that these manganese oxide or manganese-containing oxide supports exert remarkable stabilizing influences on the Group VIII metals so dispersed. The skilled practitioner will know which combinations of the above will yield either manganese-containing oxide compounds or mixtures of manganese and other oxides (or both) and can choose the combination he desires. These stabilizing influences are evidenced by the suppression of the ability of the dispersed supported Group VIII metals to chemisorb hydrogen and carbon monoxide at ambient temperature ($\sim 25°$ C.).

These catalyst compositions are prepared by techniques common in the art including pretreatment when applicable, but differ from prior art techniques with respect to the pre-use contacting with a suitable reducing atmosphere such as hydrogen-containing atmosphere at the elevated temperatures herein described, which is a necessary and critical step in preparing the catalyst of this invention.

DETAILED DESCRIPTION

As has heretofore been stated the Group VIII catalytic metals must be supported on a manganese-containing oxide support. By manganese-containing oxide support is meant manganese oxide, mixtures of manganese oxide with one or more oxides of Al, Si, metals of Group 1VB, VB, IA (alkali metal), IIA (alkaline earth metal) and rare earth metals, as well as manganese-containing oxide compounds containing one or more metals of Groups 1VB, VB, IA, IIA and rare earth metals and mixtures of these compounds with said oxides. In particular this means that the support will be selected from the group consisting essentially of manganese oxide, mixtures of manganese oxide with $Al_2O_3$, $SiO_2$, and compounds and/or mixtures of Group 1VB-manganese oxides, Group VB-manganese oxides, Group IA-manganese oxides, Group IIA-manganese oxides, rare earth-manganese oxides and mixtures thereof. The support will preferably contain oxide of manganese. By way of an illustrative, but non-limiting example of what is meant by the words compounds and mixtures used above, $MnO/TiO_2$ is a mixture of a manganese oxide and a group 1VB metal oxide, whereas manganese titanate is a manganese-containing oxide compound containing a group 1VB metal.

By way of comparison, Group VIII metals supported on refractory oxide supports which do not contain manganese, such as alumina, silica, silica-alumina, etc., do not exhibit the suppression of the chemisorption of hydrogen and carbon monoxide after contact with the reducing atmosphere.

The catalytic compositions of the instant invention are prepared by techniques typical in the art. Thus, the support may be impregnated with a solution of the salt of the chosen Group VIII metals, said solution being aqueous or nonaqueous, depending solely on the discretion of the practitioner and on the solubility of the metal salt employed. The support can be impregnated with the metal salt solution by any number of standard techniques including impregnation by soaking in excess solution, incipient wetness technique, spraying, etc. These impregnated supports are then pretreated to result in metal on support catalysts.

In order to insure minimum agglomeration of the catalyst on the surface (i.e., minimize metal surface loss) and thereby take advantage of the unique interaction which occurs between the support surface and the deposited metal, it is desirable but not necessary to pretreat the oxide support (without Group VIII metal) at a temperature at least as high as the expected maximum operating temperature of the catalyst. This pretreatment can be conducted in any convenient manner in any convenient atmosphere (i.e., hydrogen, oxygen, air, etc.). In this way, any agglomeration to which the support may be prone will occur prior to the deposition and preparation of the catalyst. It should be noted, however, that the support pretreatment is merely a preferred step and not mandatory.

The Group VIII metal salt-impregnated support material composite is then subjected to a reduction by contacting same, at elevated temperature, with a suitable reducing atmosphere. Suitable reducing atmosphere will contain one or more appropriate reducing gases such as hydrogen, carbon monoxide and mixtures thereof which will reduce the catalytic metal precursors to the reduced metal form and produce a catalyst composition which exhibits suppressed hydrogen chemisorption. The reducing atmosphere may contain anywhere from 1 to 100% reducing gas, with the balance, if any, being any appropriate gas which does not adversely affect the catalyst composition. Preferred reducing atmospheres will contain from 1 to 100% hydrogen, with the balance, if any, being one or more additional reducing gases, such as CO, or inert gas. By inert gas is meant any gas which does not adversely affect the catalyst composition and which is, therefore, inert with respect thereto.

This reduction-activation must be conducted above a certain minimum temperature if the catalyst is to exhibit the suppression of hydrogen and carbon monoxide chemisorption which is an indication of the existence of a bonding interaction between the support and the Group VIII metals and which shall be identified by the term strong metal-support interaction or SMSI for short. That such an interaction indeed occurs is shown by the suppression of the ability of the Group VIII metal on the support to chemisorb hydrogen and CO. Group VIII metals are noted for their ability to chemisorb hydrogen and CO. Indeed, the ability to chemisorb is employed as a means of determining when a Group VIII metal salt on a support has been reduced to the metal. In this invention, chemisorption suppression is not due to the agglomeration of the Group VIII metal on the support or to the loss of the surface area of the supported Group VIII metals. X-ray data shows that the Group VIII metals are still in a high state of dispersion as indicated by the absence of metal peaks on the X-ray diffraction spectrum.

It has been found that a difference exists between the temperature of reduction required to reduce the Group VIII metals salt to the supported metal, as indicated by the onset of hydrogen adsorption, and the temperature required to bring about the SMSI state of the supported metal, as indicated by the suppression of hydrogen adsorption.

The temperature of hydrogen or hydrogen-containing atmosphere activation needed to confer SMSI properties on the Group VIII metal-manganese oxide system varies with the particular Group VIII metal employed. Accordingly, the proper temperature must be selected on an individual basis using the measurement of hydrogen chemisorption at room temperature to indicate passage into the SMSI state. In general, the treatment temperature falls within two ranges, those temperatures needed to achieve the SMSI state for systems comprising iron, nickel, cobalt, and mixtures thereof, preferably each metal individually on manganese oxide support (Group A) and those temperatures needed to achieve SMSI state for manganese oxide supported-noble Group VIII metals (Pt, Pd, Ir, Ru, Rh, Os, and mixtures thereof, preferably each metal individually) (Group B). For Group A the temperature is at least 300° C., preferably 400° C., most preferably 500° C., while for Group B the temperature is at least 250° C., preferably 350° C., most preferably 500° C. It is understood that the metal precursors on the catalyst composition may have been reduced at temperatures below these minimum temperatures, it being understood however, that such catalyst compositions must be contacted with the reducing atmosphere at these minimum temperatures in order to produce a catalyst composition which exhibits the reduced hydrogen chemisorption.

In general, the catalyst made by this method can have the metal loadings common to the art, i.e., Group VIII loading of from 0.01 to 20 wt. %, preferably 0.1 to 10 wt. %, most preferably 0.5 to 5 wt. %.

In the following examples, the support oxide is identified as MnO. This designation is employed purely for the sake of convenience since in reality the precise valence of the manganese surface of the oxide cannot be accurately known.

EXPERIMENTAL

The MnO supports were impregnated with aqueous solutions of $H_2IrCl_6$. Impregnations were carried out to the point of incipient wetness. Impregnates were dried at 110° C. The dried composites were charged in powder form into chemisorption cells.

A typical glass adsorption system was used which was capable of attaining a vacuum of $5 \times 10^{-7}$ torr. All chemisorption measurements were carried out at ambient temperature and were preceded by one hour activation at a specified temperature, followed by evacuation at that temperature to $\leq 10^{-5}$ torr. The activating gas was flowing hydrogen (20 l/hr.) purified by passage through a catalytic de-oxygenator, a molecular sieve drying trap and a liquid nitrogen trap.

The experimental procedure employed the optional thermal treatment of the support before impregnation with the iridium salt. This was usually carried out in hydrogen, for a duration of 2-4 hours. The pretreatment temperature equalled or exceeded the highest temperature to which the iridium-containing catalyst was subsequently subjected. The purpose of this was to prevent severe agglomeration of the support in the presence of the metal, which can lead to lowered dispersion of the latter, and possibly, to trapped metal particles, i.e., particles not accessible to the gas phase. It must be noted that such a thermal treatment of the support is not an essential or critical aspect of the invention.

TABLE I

Thermal Treatments, Surface Areas and Incipient-Wetness Factors of Supports

|  | Thermal Treatment Medium, T° C. | S.A., m²/g | Incipient-Wetness Factor, cc/gm | Notes |
|---|---|---|---|---|
| MnO(A) | H₂,740 | 7.8 | 0.36 | |
| MnO(B) | H₂,540 | 21.7 | 0.41 | S.A. of Spent Catalyst = 15.2 m²/g |

In Table II are presented the complete set of data relating hydrogen chemisorption to catalyst activation. The specific hydrogen-adsorption, H/M, equal to the atomic ratio of hydrogen adsorbed at 25° C. to iridium contained in the catalyst, is tabulated as a function of $T_A$, the temperature of activation in hydrogen preceding this measurement. The maximum value of $T_A$ used was 500° C. This was done since SMSI behavior was clearly in evidence at this point. As an operating guide, a value of H/M $\leq 0.05$ was chosen. An H/M ratio of 0.05 can be related to an average iridium particle size of 200Å, which is expected to produce clearly observable X-ray peaks. X-ray diffraction examination of the iridium manganese oxide catalyst showed no iridium peaks, thus the metal has not agglomerated and the low H/M ratio is not due to metal agglomeration.

TABLE II

H/M* as Function of $T_A$** For Supported Iridium Catalysts

| Support | Wt. % Iridium | 198–205 | 348–354 | 498–503 |
|---|---|---|---|---|
| MnO(A) | 2 | 0.46 | 0.041 | <0.01 |
| MnO(B) | 2 | 1.08 | — | <0.01 |
| MnO(B) | 2 (Rh) | — | — | <0.01 |

*H/M = Atoms hydrogen adsorbed at 25° C. per atom iridium present in catalyst. The precision of H/M in these measurements is estimated as ±0.01.
**$T_A$ = Temperature, °C., of activation in hydrogen.

In the case of Ir/MnO(A) the relatively low H/M ratio relates to the low surface area of the support (7.8

$m^2/g$) which does not greatly exceed the calculated area required for complete dispersion of 2% iridium (4.7 $m^2/g$ catalyst).

The value of these high dispersions lies in the fact that they increase the magnitude of potential decrease of H/M which can be attributed to the strong metal-support interaction.

MnO(A): $MnO_2$ (Diamond-Shamrock, Battery Grade) was obtained. The listed impurities were 0.2% Fe, 0.2% Na, 0.2% K, 0.4% alkaline earth metals, <0.05% heavy metals. This material was pre-treated ($H_2$) @ 740°. X-ray diffraction (XRD) showed MnO, v. sm. broad signal at $19\frac{1}{2}°-21\frac{1}{2}°$, possible signal, even smaller, at 29°-31°. These extra peaks presumably represent an oxide or oxy-hydroxide formed at the MnO surface upon exposure to air although no specific assignment could be made. S.A.=7.8 $m^2/g$.

XRD pattern of the spent catalyst (2% Ir/MnO(A), activated in $H_2$ at temperatures up to 500°), was essentially unchanged from that of MnO(A); no iridium peaks, but principal peak of iridium overlaps one of MnO.

MnO(B): $MnO_2$ (Diamond-Shamrock, Battery Grade) was pre-treated ($H_2$) @ 540°. Although the material was pea-green during reduction, indicating MnO, upon exposure to air it quickly blackened (a brownish-green was observed upon air-exposure of MnO(A)). XRD showed $Mn_3O_4$ as the principal phase, MnO also present, barely detectable signal @ 21°. S.A.=21.7 $m^2/g$.

XRD pattern of the spent catalyst (2% Ir/MnO(B), activated in $H_2$ at temperatures up to 500°), showed MnO, barely detectable signal @ 20°-21°; no iridium peaks, but principal peak of iridium overlaps one of MnO. S.A.=15.2 $m^2/g$. 2% Ir/MnO(B):

Calcined @ 500°, 4 hrs. XRD showed $Mn_3O_4$, no other phases, no $IrO_2$ peaks. The calcined catalyst was investigated for hydrogen chemisorption (@ RT) after reduction @ 205°, 350° and 500°. H/M values were, respectively, 0.43, 0.27, and 0.009. XRD of catalyst after these measurements showed MnO, tr. intensity @ 20°.

What is claimed is:

1. Improved catalytic compositions comprising catalytic metal selected from the group consisting of iron, nickel, cobalt and mixtures thereof supported on a manganese-containing oxide support, the improvement comprising as a final step before use, contacting said catalyst composition with a reducing atmosphere at a temperature of at least about 300° C. to produce a catalyst composition which exhibits suppressed hydrogen chemisorption.

2. The composition of claim 1 wherein the manganese-containing oxide support is selected from the group consisting essentially of (a) manganese oxide, (b) mixtures of manganese oxide with one or more oxides of Al, Si, metals of Group IVB, VB, IA, IIA and rare earth metals, (c) oxide compounds of manganese and one or more metals of Group IVB, Group VB, Group IA, Group IIA, and rare earth metals, and mixtures thereof.

3. The composition of claim 2 wherein the support contains manganese oxide.

4. The composition of claim 3 wherein the reducing atmosphere comprises hydrogen.

5. The composition of any one of claims 1, 2 or 4 wherein the temperature is at least 500° C.

6. The composition of claim 5 wherein the catalytic metal is iron.

7. The composition of claim 5, wherein the catalytic metal is nickel.

8. The composition of claim 5 wherein the catalytic metal is cobalt.

9. Improved catalytic compositions comprising a catalytic metal consisting of iridium, supported on a manganese-containing oxide support, the improvement comprising, as a final step before use, contacting said catalytic composition with a reducing atmosphere at a temperature of at least about 250° C. to produce a catalyst composition which exhibits suppressed hydrogen chemisorption.

10. The catalyst of claim 9 wherein said support is selected from the group consisting essentially of (a) manganese oxide, (b) mixtures of manganese oxide with one or more oxides of Al, Si, metals of Group IVB, VB, IA, IIA, and rare earth metals, (c) oxide compounds of manganese and one or more metals of Group IVB, VB, IIA, IA and rare earth metals, and mixtures thereof.

11. The catalyst of claim 10 wherein the reducing atmosphere comprises hydrogen.

12. The catalyst of any one of claims 9, 10, or 11, wherein the reducing temperature is at least 500° C.

13. The catalyst of claim 12 wherein the support consists essentially of MnO.

* * * * *